United States Patent
Li et al.

(10) Patent No.: US 12,266,950 B2
(45) Date of Patent: Apr. 1, 2025

(54) WIRELESS POWER COMMUNICATION APPARATUS AND METHOD

(71) Applicant: NuVolta Technologies (Hefei) Co., Ltd., Hefei (CN)

(72) Inventors: Zeng Li, Shanghai (CN); Jian Lu, Shanghai (CN); Zhijun Luo, Shanghai (CN); Jinbiao Huang, Nashua, NH (US)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 146 days.

(21) Appl. No.: 18/143,523

(22) Filed: May 4, 2023

(65) Prior Publication Data

US 2024/0313586 A1    Sep. 19, 2024

(30) Foreign Application Priority Data

Mar. 18, 2023   (CN) .......................... 202310280664.7

(51) Int. Cl.
*H02J 50/80*      (2016.01)
*H02J 50/12*      (2016.01)
*H04B 5/79*       (2024.01)

(52) U.S. Cl.
CPC .............. *H02J 50/80* (2016.02); *H02J 50/12* (2016.02); *H04B 5/79* (2024.01)

(58) Field of Classification Search
CPC .............. H02J 50/12; H02J 50/80; H04B 5/79
USPC ........................................................ 307/104
See application file for complete search history.

(56) References Cited

U.S. PATENT DOCUMENTS

| | | | | |
|---|---|---|---|---|
| 2014/0312686 A1* | 10/2014 | Shraga | ..................... | H02J 50/10 307/10.1 |
| 2017/0353054 A1* | 12/2017 | Lee | ........................... | H02J 5/00 |

* cited by examiner

*Primary Examiner* — Michael R. Fin
(74) *Attorney, Agent, or Firm* — AP3 Law Firm PLLC

(57) ABSTRACT

An apparatus includes a rectifier coupled to a receiver coil, the receiver coil configured to be magnetically coupled to a transmitter coil of a wireless power transfer system, wherein the rectifier is configured to convert an alternating current voltage into a direct current voltage, a first communication apparatus configured to provide a low speed communication to a transmitter of the wireless power transfer system, and a second communication apparatus configured to provide a high-speed communication to the transmitter of the wireless power transfer system, wherein the high-speed communication provided by the second communication apparatus is enabled through the low speed communication provided by the first communication apparatus.

15 Claims, 10 Drawing Sheets

WIRELESS POWER COMMUNICATION APPARATUS AND METHOD

PRIORITY CLAIM

This application claims priority to Chinese Patent Application No. 2023102806647, filed on Mar. 18, 2023, which is hereby incorporated by reference in its entirety.

TECHNICAL FIELD

The present invention relates to a communication apparatus, and, in particular embodiments, to a method for controlling a high-speed communication apparatus in a wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

In a wireless power transfer system, various control signals may be generated based upon the operating parameters at the secondary side receiver. The control signals may be transferred from the secondary side receiver to the primary side transmitter. In particular, the control signals may be transmitted from a receiver coil to a transmitter coil in the form of modulated signals using suitable modulation schemes. Amplitude shift keying (ASK) is a widely used modulation scheme in the receiver of the wireless power transfer system. ASK is carried out through modulating the amplitude of the analog signal in the wireless power transfer system. Information is passed through the amplitude variation of the analog signal. An analog sensing device is employed to detect the control signals, which may be included in the current and/or the voltage applied to the transmission coil. A de-modulator at the primary side transmitter may be employed to demodulate the signals detected by the analog sensing device and feed the demodulated signals to a transmitter controller so as to better control the operation of the transmitter.

The communication information may be transferred from the receiver to the transmitter through varying the operating parameters of the transmitter. One relatively simple method to vary the operating parameters of the transmitter is based on an impedance modulation method. For example, a pair of capacitor-switch networks is coupled to two terminals of the receiver coil, respectively. The switches of the pair of capacitor-switch networks are switched on and off during communication so that the impedance coupled to the receiver coil is changed. The impedance variation has an impact on the electrical characteristics of the transmitter. In response to this impact, some operating parameters (e.g., the current flowing through the transmitter coil and/or the voltage across the transmitter coil) may vary. The control circuit in the transmitter detects the variation of at least one operating parameter and retrieves the communication information through demodulating the variation of this operating parameter. The amplitude shift keying modulation based communication is also known as an in-band communication.

As wireless power transfer systems further advance, various communication technologies (e.g., Bluetooth, NFC, Wi-Fi and the like) have been used in transferring data information between transmitters and receivers.

Bluetooth is a short-distance radio frequency communication technology that is used for exchanging data information between a transmitter and a receiver of the wireless power transfer system. The Bluetooth based communication is mainly used as an alternative to wire connections. The data transfer speed of Bluetooth is about 1 M bps. Near-field communication (NFC) is a set of communication protocols that enables a communication channel between two entities (e.g., the transmitter and the receiver of the wireless power transfer system) adjacent to each other. The data transfer speed of NFC is about 424 K bps. Wi-Fi is a wireless networking technology that allows devices such as mobile devices to exchange data information with one another, creating a network. The data transfer speed of Wi-Fi is about 480 M bps.

As the power of the wireless power transfer system goes higher, there may be a need for efficiently transferring communication information from the receiver to the transmitter using the various advanced communication technologies such as Wi-Fi. The present disclosure addresses this need.

SUMMARY

These and other problems are generally solved or circumvented, and technical advantages are generally achieved, by preferred embodiments of the present disclosure which provide a method for controlling a high-speed communication apparatus in a wireless power transfer system.

In accordance with an embodiment, an apparatus comprises a rectifier coupled to a receiver coil, the receiver coil configured to be magnetically coupled to a transmitter coil of a wireless power transfer system, wherein the rectifier is configured to convert an alternating current voltage into a direct current voltage, a first communication apparatus configured to provide a low speed communication to a transmitter of the wireless power transfer system, and a second communication apparatus configured to provide a high-speed communication to the transmitter of the wireless power transfer system, wherein the high-speed communication provided by the second communication apparatus is enabled through the low speed communication provided by the first communication apparatus.

In accordance with another embodiment, a method comprises establishing a low speed communication between a receiver and a transmitter of a wireless power transfer system, transferring authentication data between the receiver and the transmitter of the wireless power transfer system using the low speed communication, sending a high-speed communication request from the receiver to a transmitter of the wireless power transfer system using the low speed communication, or receiving the high-speed communication request from the transmitter of the wireless power transfer system using the low speed communication, and once receiving a connect approval reply, establishing a high-speed communication between the receiver and the transmitter of the wireless power transfer system.

In accordance with yet another embodiment, a system comprises a first power converter coupled to a power source, a transmitter circuit coupled to an output of the first power converter, a transmitter coil coupled to the transmitter circuit, a receiver coil magnetically coupled to the transmitter coil, a rectifier connected to the receiver coil, the receiver coil being magnetically coupled to the transmitter coil, wherein the rectifier is configured to convert an alternating current voltage into a direct current voltage, a second power converter connected between the rectifier and a load, a first communication apparatus configured to provide a low speed communication between a receiver and a transmitter of the system, and a second communication apparatus configured to provide a high-speed communication between the receiver and the transmitter of the system, wherein the high-speed communication provided by the second communication apparatus is enabled through the low speed communication provided by the first communication apparatus.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a method for controlling a high-speed communication apparatus in a wireless power transfer system. The disclosure may also be applied, however, to controlling various communication devices in electronic systems. Hereinafter, various embodiments will be explained in detail with reference to the accompanying drawings.

Figure 1:
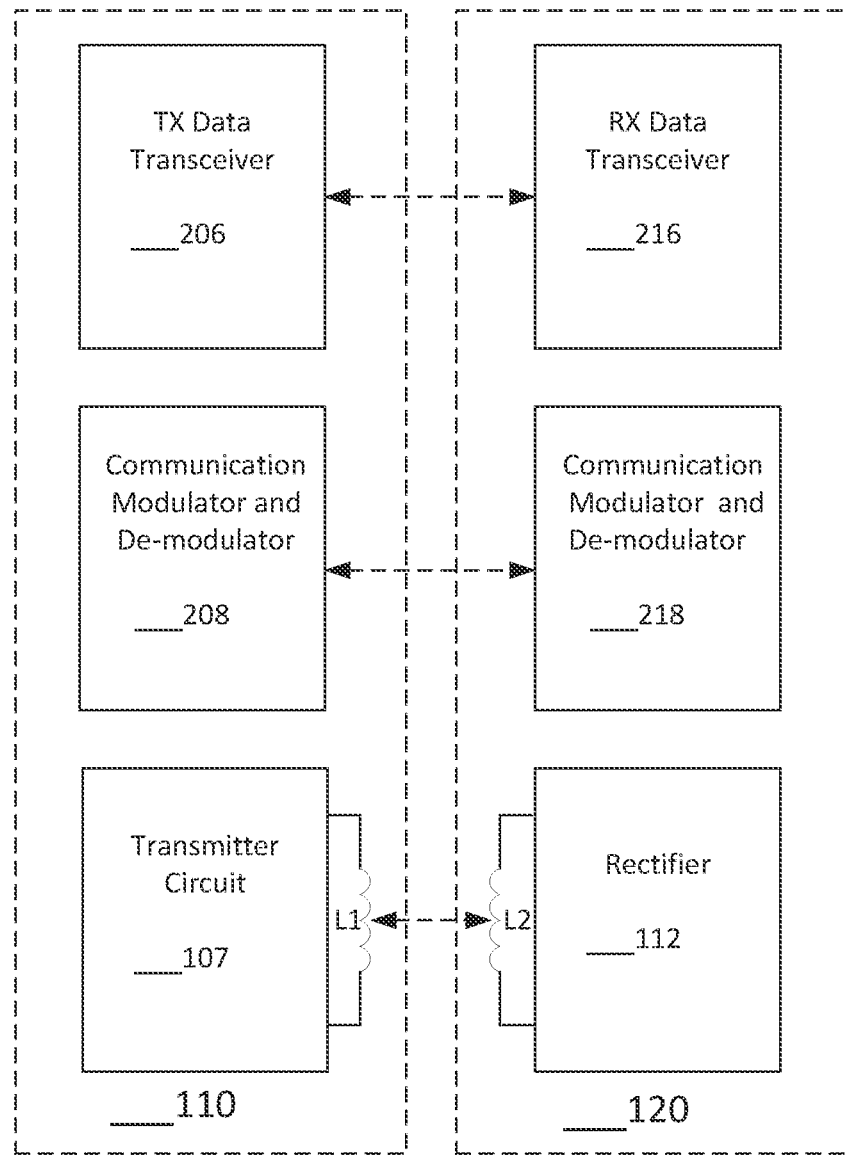
FIG. 1 illustrates a simplified block diagram of a wireless power transfer system in accordance with various embodiments of the present disclosure.

FIG. 1 illustrates a simplified block diagram of a wireless power transfer system in accordance with various embodiments of the present disclosure. The wireless power transfer system comprises a transmitter 110 and a receiver 120. The transmitter 110 comprises a transmitter data transceiver 206, a communication modulator and de-modulator 208, a transmitter circuit 107 and a transmitter coil L1. The receiver 120 comprises a receiver data transceiver 216, a communication modulator and de-modulator 218, a rectifier 112 and a receiver coil L2.

In some embodiments, the communication modulator and de-modulator 208 and the communication modulator and de-modulator 218 form a first communication apparatus of the wireless power transfer system. Under this configuration, in some embodiments, the first communication apparatus is able to provide an in-band communication between the receiver 120 and the transmitter 110 of the wireless power transfer system.

In some embodiments, the first communication apparatus comprises a communication modulator coupled to a communication de-modulator. Under this configuration, the first communication apparatus is implemented as a communication modulator in the receiver 120. The first communication apparatus (communication modulator) is configured to be coupled to a communication de-modulator in the transmitter 110. In some embodiments, the first communication apparatus is able to provide an in-band communication between the receiver 120 and the transmitter 110 of the wireless power transfer system. The in-band communication is a low speed communication between the receiver 120 and the transmitter 110 of the wireless power transfer system.

In order to achieve the in-band communication, a plurality of switch-capacitor networks may be coupled to the receiver coil L2 of the wireless power transfer system. The communication modulator and de-modulator 208 and the communication modulator and de-modulator 218 are designed based on an amplitude shift keying (ASK) modulation used by the wireless power transfer system. In operation, the plurality of switch-capacitor networks is configured such that an impedance coupled to the receiver coil is adjusted according to the ASK modulation used by the wireless power transfer system. Furthermore, the plurality of switch-capacitor networks is configured to provide a plurality of impedances coupled to the receiver coil L2 using different ON and OFF combinations of the plurality of switch-capacitor networks. In some embodiments, the plurality of impedances includes a first impedance corresponding to a high state of the ASK modulation and a second impedance corresponding to a low state of the ASK modulation. The communication modulator and de-modulator 218 in the receiver functions as an ASK modulator. The communication modulator and de-modulator 208 in the transmitter functions as an ASK de-modulator. The ASK de-modulator detects the high state and the low state of the ASK modulation and retrieves the communication information through demodulating the variation of the state of the ASK modulation.

One skilled in the art will recognize that the ASK modulation described above is simply one manner of generating the in-band communication and that other and alternate embodiment modulations could be employed (such as frequency shift keying modulation) for this function. For example, when signals are transferred from the transmitter to the receiver, the communication modulator and de-modulator 208 and the communication modulator and de-modulator 218 are designed based on a frequency shift keying (FSK) modulation used by the wireless power transfer system. In particular, the communication modulator and de-modulator 208 functions as a FSK modulator. The communication modulator and de-modulator 218 functions as a FSK de-modulator.

In some embodiments, the transmitter data transceiver 206 and the receiver data transceiver 216 form a second communication apparatus of the wireless power transfer system. In some embodiments, the second communication apparatus is able to provide a high-speed communication between the receiver 120 and the transmitter 110 of the wireless power transfer system.

In some embodiments, the second communication apparatus comprises a first data transceiver coupled to a second data transceiver. Under this configuration, the second communication apparatus is the first data transceiver in the receiver 120. The second communication apparatus (the first data transceiver) is configured to be coupled a second data transceiver in the transmitter 110 of the wireless power transfer system. In some embodiments, the second communication apparatus is able to provide a high-speed communication between the receiver 120 and the transmitter 110 of the wireless power transfer system. In some embodiments, the high-speed communication may be implemented as a Wi-Fi based high-speed communication having a data transmission speed up to 480M bits per second (bps).

In operation, the high-speed communication provided by the second communication apparatus is enabled through the low speed communication provided by the first communication apparatus. More particularly, the high-speed communication provided by the second communication apparatus is established after a handshaking process has been completed in the first communication apparatus.

In operation, the high-speed communication provided by the second communication apparatus is disconnected from the wireless power transfer system after the receiver 120 has been moved away from the transmitter 110 for a predetermined time-out period. Alternatively, the high-speed communication provided by the second communication apparatus is disconnected the wireless power transfer system after a user disconnect command has been received. For example, a key button is associated with the wireless power transfer system. When the key button is touched by a user, a disconnect instruction is generated. In response to the disconnect instruction, the high-speed communication provided by the second communication apparatus is disconnected from the wireless power transfer system immediately.

One advantageous feature of having the high-speed communication provided by the second communication apparatus is that the high-speed communication helps to eliminate the acoustic noise caused by the in-band communication.

Figure 2:
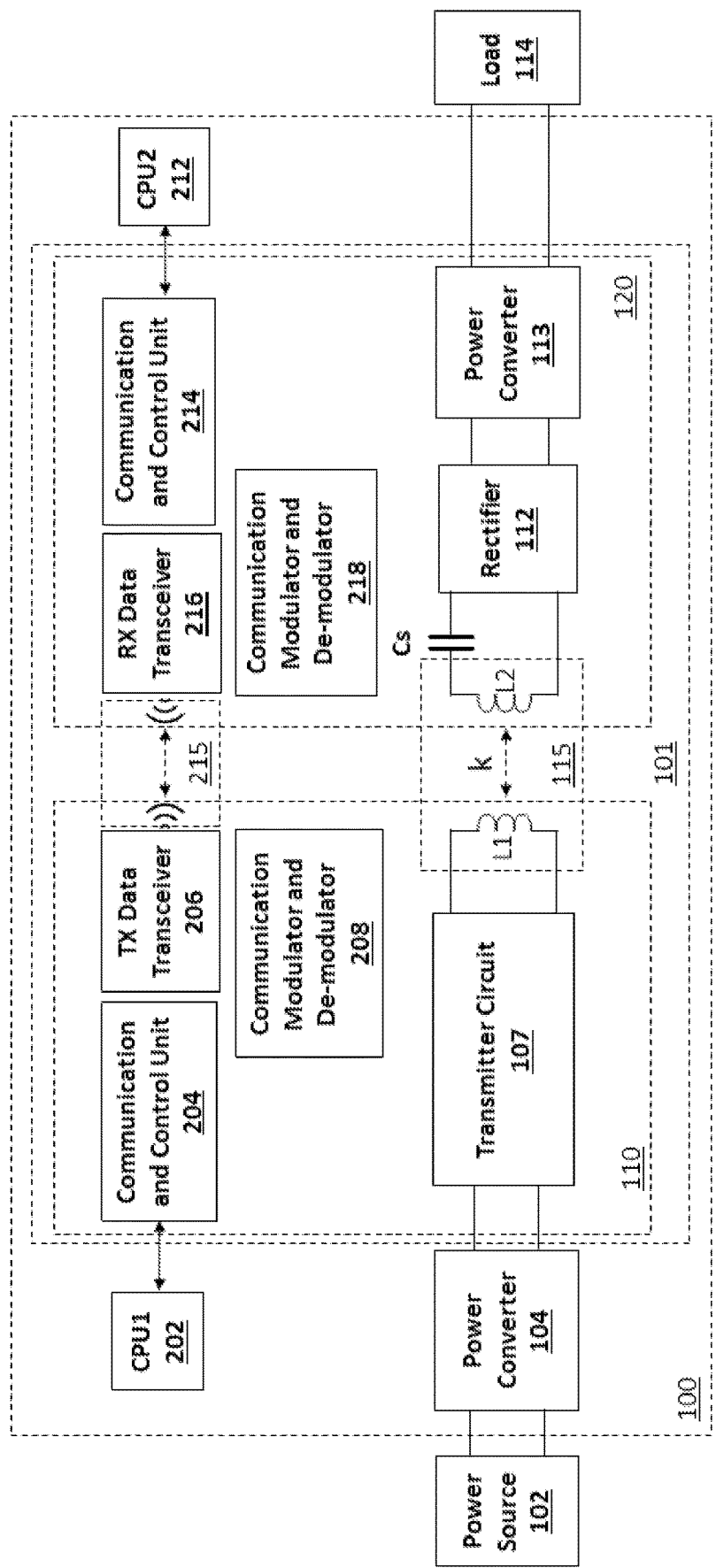
FIG. 2 illustrates a block diagram of the wireless power transfer system in accordance with various embodiments of the present disclosure.

FIG. 2 illustrates a block diagram of the wireless power transfer system in accordance with various embodiments of the present disclosure. The wireless power transfer system 100 comprises a power converter 104 and a wireless power transfer device 101 connected in cascade between an input power source 102 and a load 114. In some embodiments, the power converter 104 is employed to further improve the performance of the wireless power transfer system 100. In alternative embodiments, the power converter 104 is an optional element. In other words, the wireless power transfer device 101 may be connected to the input power source 102 directly.

The wireless power transfer device 101 includes a transmitter 110 and a receiver 120. As shown in FIG. 2, the transmitter 110 comprises a transmitter circuit 107 and a transmitter coil L1 connected in cascade. The input of the transmitter circuit 107 is coupled to an output of the power converter 104. The transmitter 110 further comprises a communication and control unit 204, a transmitter data transceiver 206 and a communication modulator and de-modulator 208. A first processor CPU1 202 is coupled to the transmitter 110 as shown in FIG. 2.

The receiver 120 comprises a receiver coil L2, a resonant capacitor Cs, a rectifier 112 and a power converter 113 connected in cascade. As shown in FIG. 2, the resonant capacitor Cs is connected in series with the receiver coil L2 and further connected to the inputs of the rectifier 112. The outputs of the rectifier 112 are connected to the inputs of the power converter 113. The outputs of the power converter 113 are coupled to the load 114. The receiver 120 further comprises a communication and control unit 214, a receiver data transceiver 216 and a communication modulator and de-modulator 218. A second processor CPU2 212 is coupled to the receiver 120 as shown in FIG. 2.

The transmitter 110 is magnetically coupled to the receiver 120 through a magnetic field when the receiver 120 is placed near the transmitter 110. A loosely coupled transformer 115 is formed by the transmitter coil L1, which is part of the transmitter 110, and the receiver coil L2, which is part of the receiver 120. As a result, electrical power may be transferred from the transmitter 110 to the receiver 120.

In some embodiments, the transmitter 110 may be inside a charging pad. The transmitter coil L1 is placed underneath the top surface of the charging pad. The receiver 120 may be embedded in a mobile phone. When the mobile phone is placed near the charging pad, a magnetic coupling may be established between the transmitter coil L1 and the receiver coil L2. In other words, the transmitter coil L1 and the receiver coil L2 may form a loosely coupled transformer through which a power transfer occurs between the transmitter 110 and the receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the transmitter 110 and the receiver 120 may form a power system through which power is wirelessly transferred from the input power source 102 to the load 114.

The input power source 102 may be a power adapter converting a utility line voltage to a direct current (dc) voltage. Alternatively, the input power source 102 may be a renewable power source such as a solar panel array. Furthermore, the input power source 102 may be any suitable energy storage devices such as rechargeable batteries, fuel cells, any combinations thereof and/or the like.

The load 114 represents the power consumed by the mobile device (e.g., a mobile phone) coupled to the receiver 120. Alternatively, the load 114 may refer to a rechargeable battery and/or batteries connected in series/parallel, and coupled to the output of the receiver 120. Furthermore, the load 114 may be a downstream power converter such as a battery charger.

The transmitter circuit 107 may comprise primary side switches of a full-bridge converter according to some embodiments. Alternatively, the transmitter circuit 107 may comprise the primary side switches of any other suitable power converters such as a half-bridge converter, a push-pull converter, any combinations thereof and/or the like.

It should be noted that the power converters described above are merely examples. One having ordinary skill in the art will recognize other suitable power converters such as class E topology based power converters (e.g., a class E amplifier), may alternatively be used depending on design needs and different applications.

The transmitter circuit 107 may further comprise a resonant capacitor (not shown). The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The receiver 120 comprises the receiver coil L2 magnetically coupled to the transmitter coil L1 after the receiver 120 is placed near the transmitter 110. As a result, power may be transferred to the receiver coil and further delivered to the load 114 through the rectifier 112. The receiver 120 may comprise a secondary resonant capacitor Cs as shown in FIG. 2. Throughout the description, the secondary resonant capacitor Cs may be alternatively referred to as a receiver resonant capacitor.

The receiver 120 may further comprise a communication apparatus. The communication apparatus comprising a plurality of first capacitor-switch networks and a plurality of second capacitor-switch networks. The plurality of first capacitor-switch networks is connected in parallel between a first input terminal of the rectifier 112 and ground. The plurality of second capacitor-switch networks is connected in parallel between a second input terminal of the rectifier 112 and ground. The on and off of the plurality of first capacitor-switch networks and the plurality of second capacitor-switch networks are controlled such that the communication modulator and de-modulator 218 and the communication modulator and de-modulator 208 are able to provide the in-band communication between the receiver 120 and the transmitter 110.

The rectifier 112 converts an alternating polarity waveform received from the resonant tank comprising the receiver coil L2 and the receiver resonant capacitor Cs to a single polarity waveform. The rectifier 112 can be a full-wave diode bridge or a half-wave diode bridge. In some embodiments, the rectifier 112 comprises a full-wave diode bridge and an output capacitor. In alternative embodiments, the full-wave diode bridge may be replaced by a full-wave bridge formed by switching elements such as n-type metal oxide semiconductor (NMOS) transistors.

Furthermore, the rectifier 112 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 112 are well known in the art, and hence are not discussed herein.

The power converter 113 is coupled between the rectifier 112 and the load 114. The power converter 113 is a non-isolated power converter. In some embodiments, the power converter 113 is implemented as a linear regulator such as a low-dropout regulator (LDO). In alternative embodiments, the power converter 113 is implemented as a step-down power converter such as a buck converter. Moreover, the power converter 113 may be implemented as a four-switch buck-boost power converter.

Furthermore, the power converter 113 may be implemented as a hybrid power converter. The hybrid converter is a non-isolated power converter. By controlling the on/off of the switches of the hybrid converter, the hybrid converter can be configured as a buck converter, a charge pump converter or a hybrid converter.

Moreover, the power converter 113 may comprise a first power stage and a second power stage connected in cascade. The first power stage is configured to operate in different modes for efficiently charging the load 114 (e.g., a rechargeable battery). In some embodiments, the first stage may be implemented as a step-down power converter (e.g., a buck converter), a four-switch buck-boost converter, a hybrid converter and any combinations thereof. The second power stage is configured as a voltage divider or an isolation switch.

Figure 3:
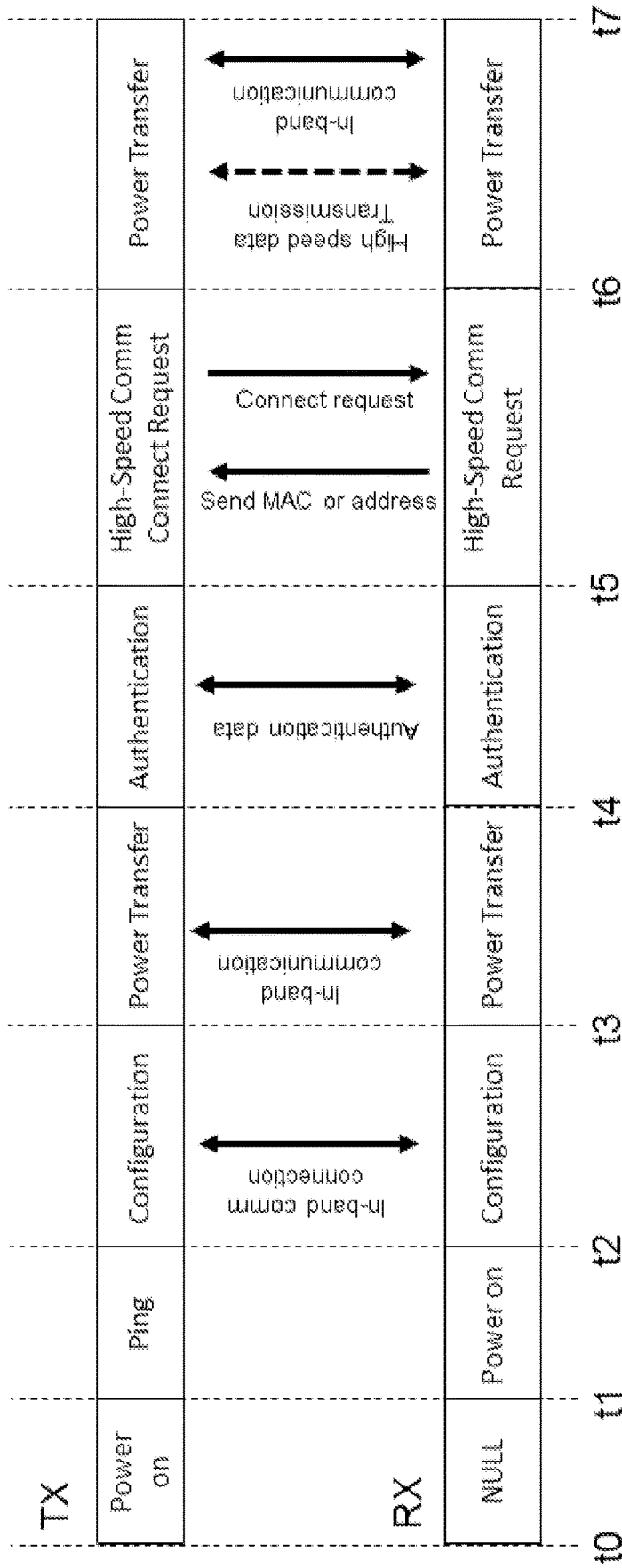
FIG. 3 illustrates a timing diagram of the handshaking process for establishing the high-speed communication in accordance with various embodiments of the present disclosure.

FIG. 3 illustrates a timing diagram of the handshaking process for establishing the high-speed communication in accordance with various embodiments of the present disclosure. The timing diagram includes two rows. The upper row represents the status of the transmitter of the wireless power transfer system. The lower row represents the status of the receiver of the wireless power transfer system.

At t0, the transmitter is powered on. From t0 to t1, the receiver is in a null state. The null state is a state where the receiver does not receiver power. At t1, the transmitter enters into the ping phase in which a plurality of ping signals is employed to detect the presence of the receiver. In some embodiments, the ping signals are achieved by applying a plurality of test pulses to the transmitter coil. Once the presence of the receiver has been detected, the receiver is powered on in the time period from t1 to t2.

From t2 to t3, the in-band communication between the transmitter and the receiver has been established. Through the in-band communication, both the transmitter and the receiver enter into the configuration phase. In the configuration phase, the transmitter identifies the receiver and obtains various configuration parameters (e.g., the maximum amount of power that the receiver is able to process) sent from the receiver. Based on the configuration parameters, the transmitter and the receiver determine power transfer settings accordingly.

At t3, both the transmitter and the receiver enter into the power transfer phase in which power is transferred from the transmitter to the receiver. In addition, the in-band communication between the transmitter and the receiver remains on from t3 to t4. In other words, transferring power between the receiver and the transmitter, and transferring data information using the in-band communication between the receiver and the transmitter are carried out concurrently from t3 to t4.

From t4 to t5, the transmitter and the receiver enter into the authentication phase in which the transmitter determines if a certified device is detected through the in-band communication. Furthermore, the transmitter adjusts the power transfer level accordingly based on the status of the receiver. For example, if an uncertified device is detected, the power transferred from the transmitter to the receiver may be reduced to a lower level so as to protect the wireless power transfer system from being damaged.

Once the authentication phase finishes, the transmitter and the receiver enter into the high-speed communication request phase at t5. In this phase, there is a handshaking process between the transmitter and the receiver. This handshaking process is employed to enable the high-speed communication between the transmitter and the receiver.

As shown in FIG. 3, through the in-band communication between the transmitter and the receiver, the receiver sends a high-speed communication authentication signal. In some embodiments, the high-speed communication authentication signal may be a media access control (MAC) address. The MAC address is used to identify the receiver. After an authentication process is complete, the transmitter determines whether it is necessary to establish the high-speed communication. Once the transmitter approves the high-speed communication, a connect request signal is sent to the receiver using the in-band communication between the transmitter and the receiver. Once the high-speed communication request phase is complete, the high-speed communication between the transmitter and the receiver is established at t6.

In operation, the connect request described above can be implemented in other suitable manners. In a first implementation, the transmitter sends a MAC address to the receiver. The receiver determines whether it is necessary to establish the high-speed communication. Once the receiver approves the high-speed communication, a connect request signal is sent to the transmitter using the in-band communication between the transmitter and the receiver. After this, the high-speed communication is established in the wireless power transfer system.

In a second implementation, the receiver sends both the MAC address and the connect request signal to the transmitter using the in-band communication. The transmitter determines whether these two signals match the pre-registered information. If these two signals match the pre-registered information, the transmitter and the receiver establish the high-speed communication immediately.

In a third implementation, the transmitter sends both the MAC address and the connect request signal to the receiver using the in-band communication. The receiver determines whether these two signals match the pre-registered information. If these two signals match the pre-registered information, the transmitter and the receiver establish the high-speed communication immediately.

As shown in FIG. 3, from t6 to t7, there are two communications between the transmitter and the receiver. The dashed line represents the high-speed communication between the transmitter and the receiver. The solid line represents the in-band communication between the transmitter and the receiver. From t6 to t7, power is transferred from the transmitter to the receiver. In other words, in the time period from t6 to t7, transferring power between the receiver and the transmitter, transferring first data information using the in-band communication between the receiver and the transmitter, and transferring second data information using the high-speed communication between the receiver and the transmitter are carried out concurrently.

Figure 4:
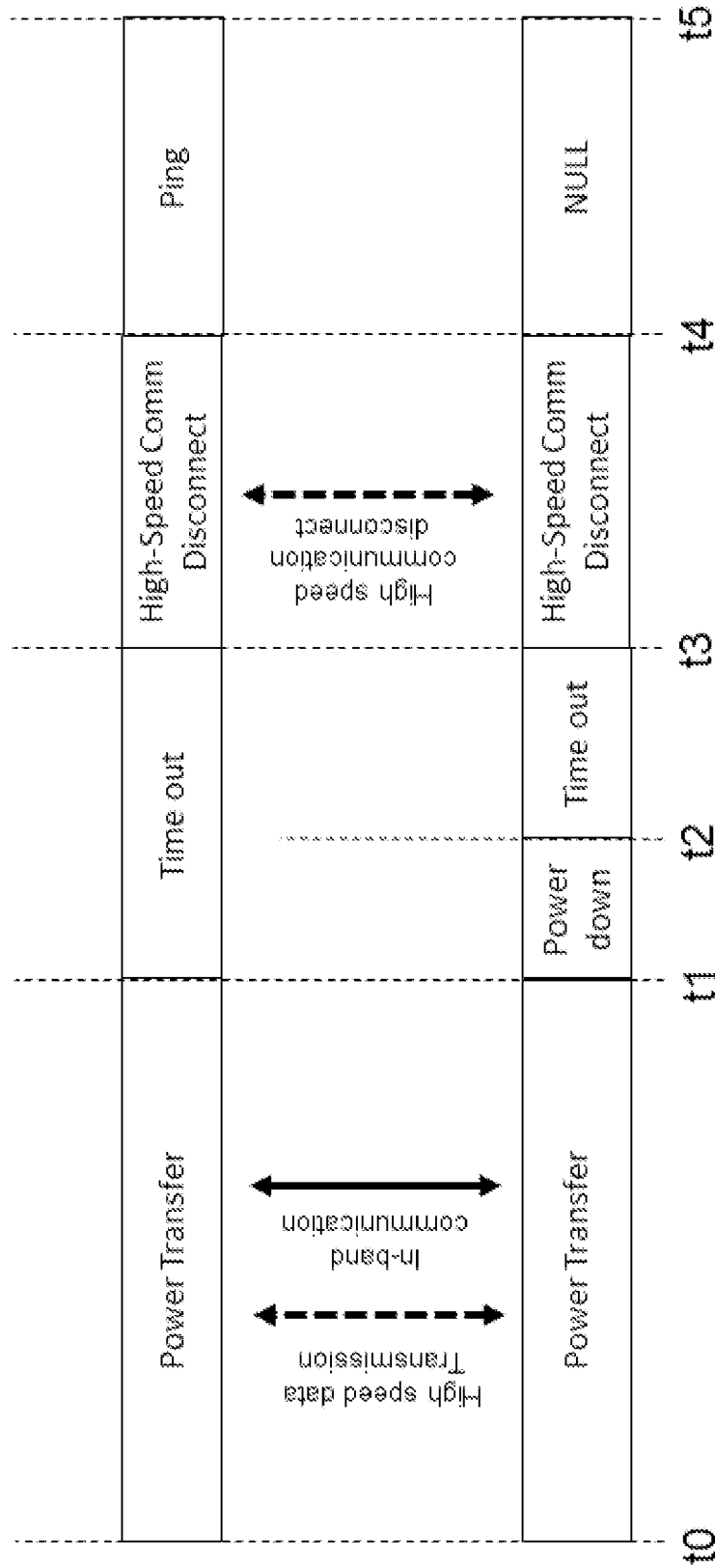
FIG. 4 illustrates a timing diagram of the process for disconnecting the high-speed communication in accordance with various embodiments of the present disclosure.

FIG. 4 illustrates a timing diagram of the process for disconnecting the high-speed communication in accordance with various embodiments of the present disclosure. The timing diagram includes two rows. The upper row represents the status of the transmitter of the wireless power transfer system. The lower row represents the status of the receiver of the wireless power transfer system.

From t0 to t1, the operating principle of the transmitter and the receiver is similar to that discussed above with respect to the time period from t6 to t7 of FIG. 3, and hence is not discussed herein to avoid repetition.

At t1, the receiver is removed from the transmitter (e.g., the receiver is removed from a targeted area). In response to this change, the output voltage of the rectifier in the receiver falls down. The receiver is in a power-down state as shown in FIG. 4. After a predetermined time-out period (e.g., about 1.5 seconds from t1 to t2), the in-band communication between the receiver and the transmitter is off. From t2 to t3, both the transmitter and the receiver are in a time-out period. From t3 to t4, the high-speed communication is disconnected from the wireless power transfer system.

From t4 to t5, the receiver is in the null state. The transmitter enters into the ping phase in which a plurality of ping signals are employed to detect the presence of the receiver.

As described above, the high-speed communication is disconnected from the wireless power transfer system after the receiver is removed from the transmitter. In alternative embodiments, the high-speed communication is disconnected from the wireless power transfer system after a disconnect signal is transferred between the receiver and the transmitter. The disconnect signal can be implemented in various ways.

In a first implementation, the receiver sends a disconnect signal to the transmitter through the in-band communication between the receiver and the transmitter. Once the transmitter receives the disconnect signal, the high-speed communication is disconnected from the wireless power transfer system immediately.

In a second implementation, the transmitter sends a disconnect signal to the receiver through the in-band communication between the receiver and the transmitter. Once the receiver receives the disconnect signal, the high-speed communication is disconnected from the wireless power transfer system immediately.

In a third implementation, the receiver sends a disconnect signal to the transmitter through the high-speed communication between the receiver and the transmitter. Once the transmitter receives the disconnect signal, the high-speed communication is disconnected from the wireless power transfer system immediately.

In a fourth implementation, the transmitter sends a disconnect signal to the receiver through the high-speed communication between the receiver and the transmitter. Once the receiver receives the disconnect signal, the high-speed communication is disconnected from the wireless power transfer system immediately.

In a fifth implementation, the receiver sends the disconnect signal to the transmitter through both the in-band communication and the high-speed communication. The disconnect signal transferred by the in-band communication and the disconnect signal transferred by the high-speed communication are sent to the transmitter in an alternating manner. Once the transmitter receives two consecutive valid disconnect signals, the high-speed communication is disconnected from the wireless power transfer system immediately.

In a sixth implementation, the transmitter sends the disconnect signal to the receiver through both the in-band communication and the high-speed communication. The disconnect signal transferred by the in-band communication and the disconnect signal transferred by the high-speed communication are sent to the receiver in an alternating manner. Once the receiver receives two consecutive valid disconnect signals, the high-speed communication is disconnected from the wireless power transfer system immediately.

Figure 5:
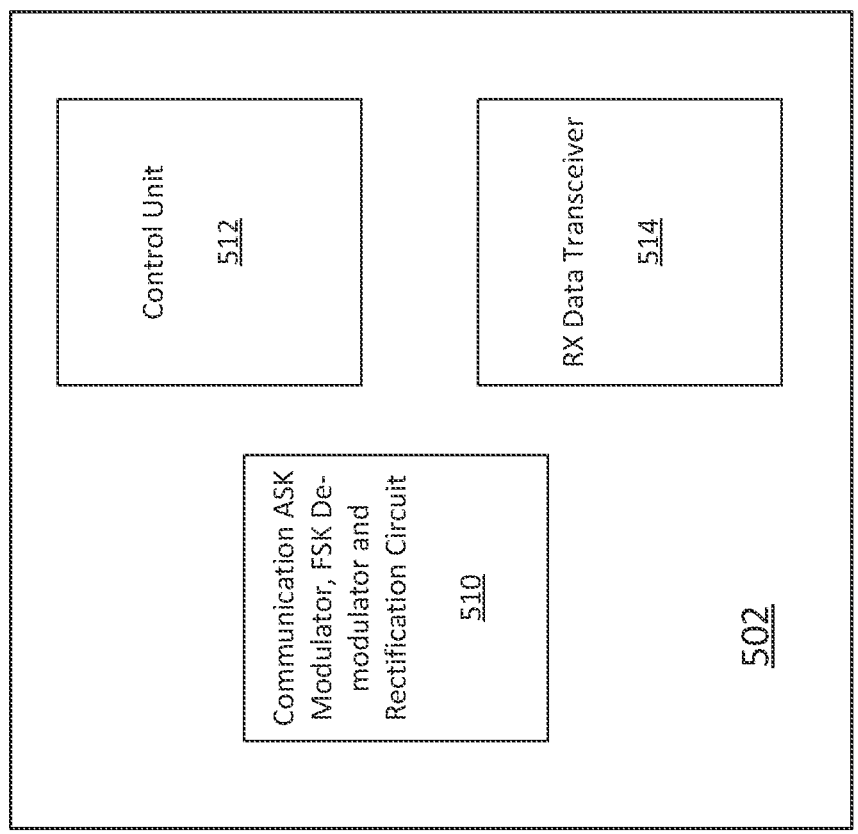
FIG. 5 illustrates a first semiconductor package implementation of the receiver in accordance with various embodiments of the present disclosure.

FIG. 5 illustrates a first semiconductor package implementation of the receiver in accordance with various embodiments of the present disclosure. The receiver of the wireless power transfer system comprises a plurality of function units. More particularly, the receiver may comprise a communication ASK modulator, FSK de-modulator and rectification circuit 510 (e.g., the communication and control unit 214, the communication modulator and de-modulator 218, the rectifier 112 and the power converter 113 shown in FIG. 2), a receiver data transceiver 514 (e.g., the RX data transceiver 216 shown in FIG. 2), and a control unit 512 (e.g., the CPU2 212 shown in FIG. 2).

In some embodiments, the control unit 512 is fabricated in a first semiconductor die. The semiconductor fabrication process of the first semiconductor die may be an advanced process such as the 90 nm eFlash process. The communication ASK modulator, FSK de-modulator and rectification circuit 510 including the rectifier, the ASK modulator, the FSK de-modulator and the power converter is fabricated in a second semiconductor die. The semiconductor fabrication process of the second semiconductor die may be a suitable power management process such as the 180 nm bipolar-CMOS-DMOS (BCD) process. The receiver data transceiver 514 is fabricated in a third semiconductor die. The first semiconductor die, the second semiconductor die and the third semiconductor die are embedded in a same semiconductor package 502. In some embodiments, the semiconductor package 502 is implemented as an embedded wafer level ball grid array (eWLB) package. In alternative embodiments, the semiconductor package 502 is implemented as an embedded silicon fan out (eSiFO) package. Both the eWLB package and the eSiFO package are well known in the art, and hence are not discussed in further detail herein.

One advantageous feature of packaging three different dies into one simple package is that integrating three semiconductor dies into one package helps improve the system performance and reducing the cost of the wireless power transfer system.

Figure 6:
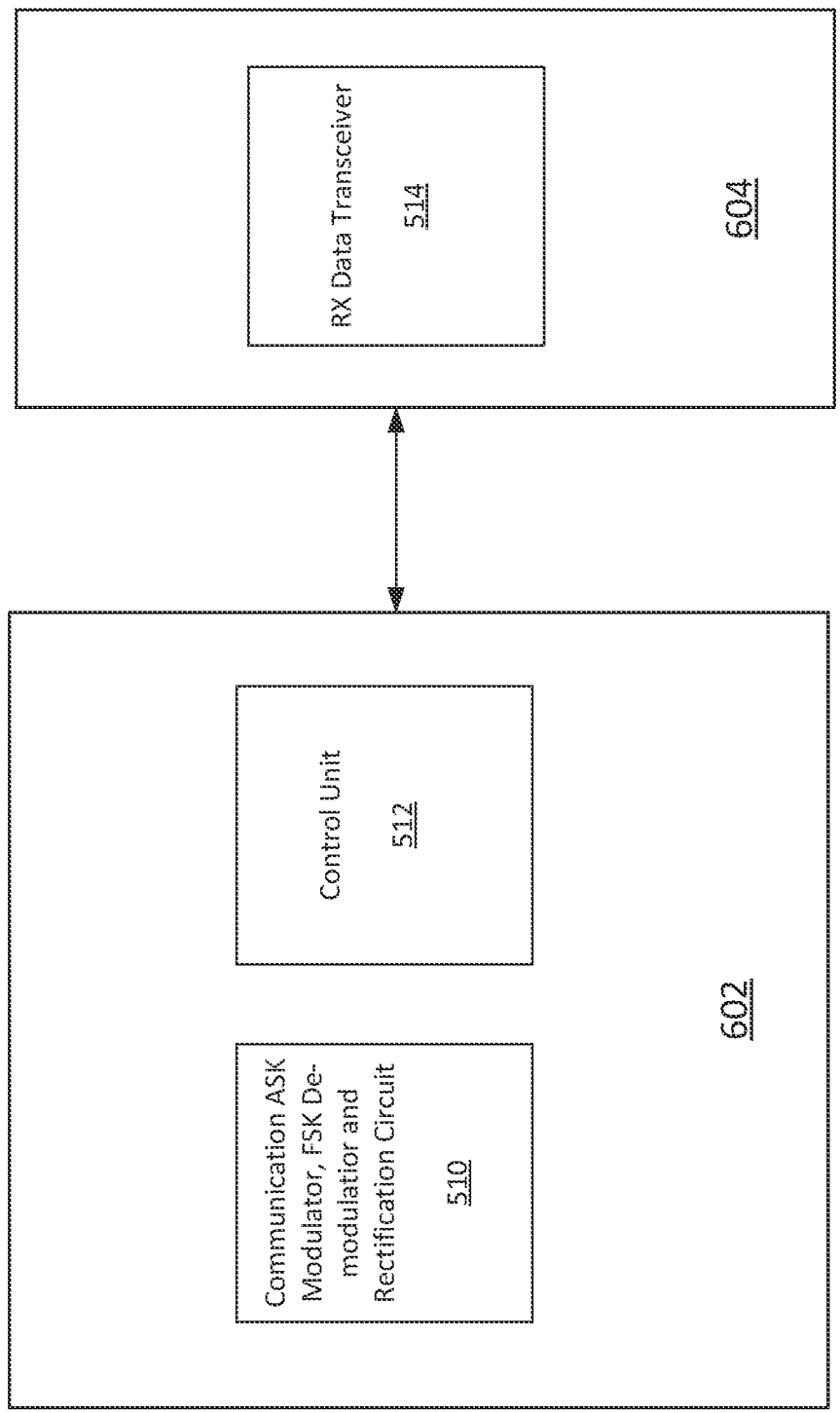
FIG. 6 illustrates a second semiconductor package implementation of the receiver in accordance with various embodiments of the present disclosure.

FIG. 6 illustrates a second semiconductor package implementation of the receiver in accordance with various embodiments of the present disclosure. The function units shown in FIG. 6 are similar to those shown in FIG. 5, and hence are not discussed again herein.

In some embodiments, the control unit 512 is fabricated in a first semiconductor die. The semiconductor fabrication process of the first semiconductor die may be an advanced process such as the 90 nm eFlash process. The communication ASK modulator, FSK de-modulator and rectification circuit 510 including the rectifier, the ASK modulator, the FSK de-modulator and the power converter is fabricated in a second semiconductor die. The semiconductor fabrication process of the second semiconductor die may be a suitable power management process such as the 180 nm BCD process. The receiver data transceiver 514 is fabricated in a third semiconductor die. The first semiconductor die and the second semiconductor die are embedded in a first semiconductor package 602. In some embodiments, the first semiconductor package 602 is implemented as an eWLB package. In alternative embodiments, the first semiconductor package 602 is implemented as an eSiFO package. The third semiconductor die is embedded in a second semiconductor package 604. The first semiconductor package 602 is electrically coupled to the second semiconductor package 604 through suitable connections such as wires on a printed circuit board.

Figure 7:
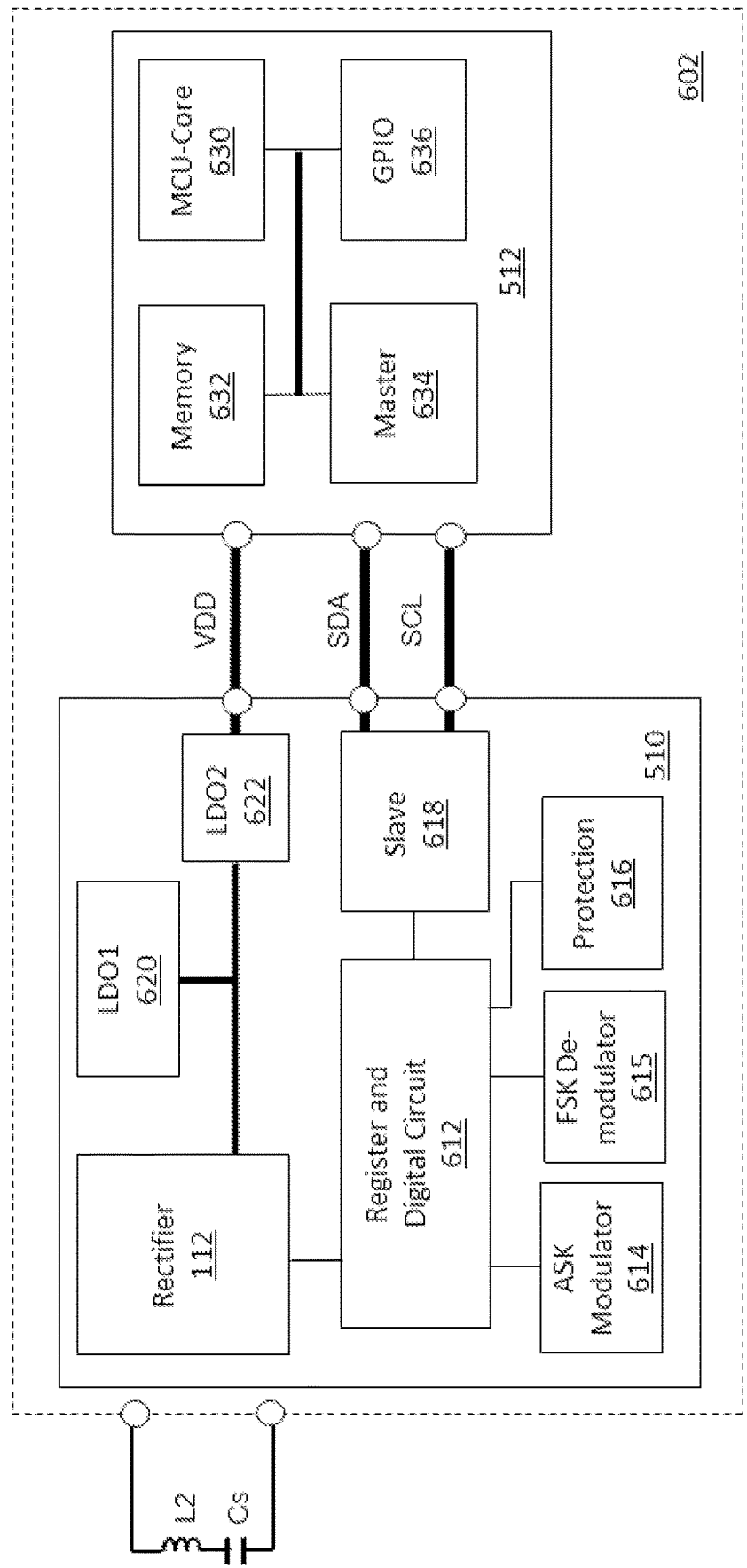
FIG. 7 illustrates a block diagram of the second semiconductor package implementation of the receiver in accordance with various embodiments of the present disclosure.

FIG. 7 illustrates a block diagram of the second semiconductor package implementation of the receiver in accordance with various embodiments of the present disclosure. As shown in FIG. 7, the control unit 512 is fabricated in the first semiconductor die. The communication ASK modulator, FSK de-modulator and rectification circuit 510 is fabricated in a second semiconductor die. The first semiconductor die and the second semiconductor die are embedded in the first semiconductor package 602. The first semiconductor package 602 is coupled to the receiver coil L2 through the receiver resonant capacitor Cs.

As shown in FIG. 7, the communication ASK modulator, FSK de-modulator and rectification circuit 510 comprises the rectifier 112, a first linear regulator 620, a second linear regulator 622, a register and digital circuit 612, a slave processor 618, an ASK modulator 614, a FSK de-modulator 615 and a protection circuit 616. Referring back to FIG. 2, the power converter 113 is implemented as the first linear regulator 620. The first linear regulator 620 is an LDO. The second linear regulator 622 is employed to provide a bias voltage VDD. The communication modulator and de-modulator 218 includes the ASK modulator 614 and the FSK de-modulator 615. The register and digital circuit 612, the slave processor 618 and the protection circuit 616 are part of the communication and control unit 214 shown in FIG. 2. The register and digital circuit 612, the slave processor 618 and the protection circuit 616 are configured to provide various control and protection functions for the receiver.

As shown in FIG. 7, the control unit 512 comprises a microcontroller (MCU) core 630, a general-purpose input/output (GPIO) 636, a memory unit 632 and a master processor 634. These four functions units are well known in the art, and hence are not discussed in detail herein. As shown in FIG. 7, there are three buses VDD, SDA and SCL connected between the communication ASK modulator, FSK de-modulator and rectification circuit 510 and the control unit 512. VDD is the voltage bus providing bias power for the control unit 512. SDA is a serial data line. SCL is a serial clock line.

Figure 8:
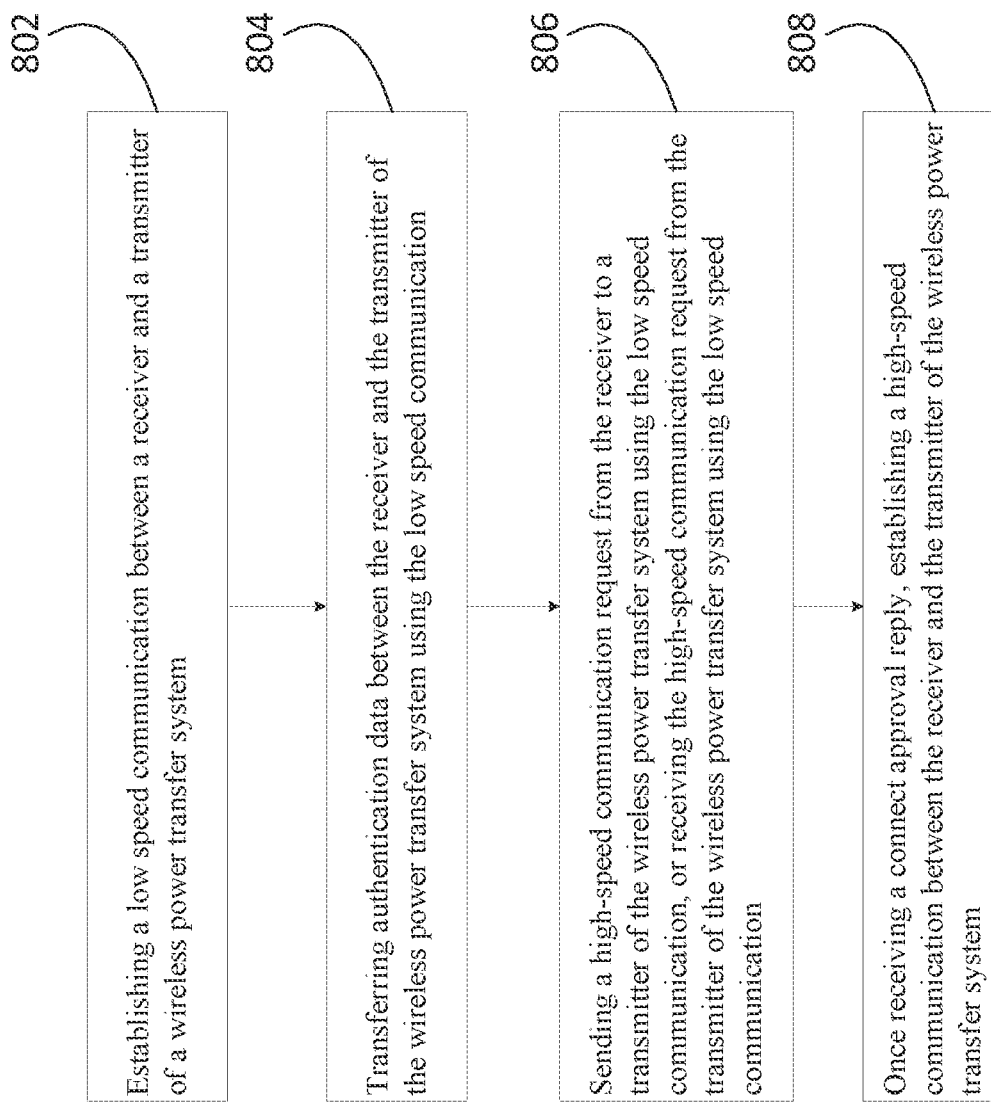
FIG. 8 illustrates a flow chart showing a method of establishing the high-speed communication in accordance with various embodiments of the present disclosure.

FIG. 8 illustrates a flow chart showing a method of establishing the high-speed communication in accordance with various embodiments of the present disclosure. This flowchart shown in FIG. 8 is merely an example, which should not unduly limit the scope of the claims. One of ordinary skill in the art would recognize many variations, alternatives, and modifications. For example, various steps illustrated in FIG. 8 may be added, removed, replaced, rearranged and repeated.

Referring back to FIG. 1, the wireless power transfer system comprises a first communication apparatus and a second communication apparatus. The first communication apparatus comprises a communication modulator (e.g., the ASK modulator in the communication modulator and de-modulator 218 shown in FIG. 1). Alternatively, the first communication apparatus comprises a communication modulator (e.g., the ASK modulator in the communication modulator and de-modulator 218 shown in FIG. 1) and a communication de-modulator (e.g., the ASK de-modulator in the communication modulator and de-modulator 208 shown in FIG. 1). The communication modulator is in the receiver (e.g., receiver 120 shown in FIG. 1). The communication de-modulator is in the transmitter (e.g., transmitter 110 shown in FIG. 1). The first communication apparatus is configured to provide a low speed communication between the receiver and the transmitter of the wireless power transfer system.

The second communication apparatus comprises a first data transceiver (e.g., RX data transceiver 216 shown in FIG. 1). Alternatively, the second communication apparatus comprises a first data transceiver (e.g., RX data transceiver 216 shown in FIG. 1) and a second data transceiver (e.g., TX data transceiver 206 shown in FIG. 1). The first data transceiver is in the receiver. The second data transceiver is in the transmitter. The second communication apparatus is configured to provide a high-speed communication between the receiver and the transmitter of the wireless power transfer system.

At step 802, a low speed communication is established between a receiver and a transmitter of a wireless power transfer system.

At step 804, authentication data is transferred between the receiver and the transmitter of the wireless power transfer system using the low speed communication.

At step 806, a high-speed communication request is sent from the receiver to a transmitter of the wireless power transfer system using the low speed communication, or the high-speed communication request is received from the transmitter of the wireless power transfer system using the low speed communication.

At step 808, once receiving a connect approval reply, a high-speed communication is established between the receiver and the transmitter of the wireless power transfer system.

Referring back to FIG. 2, the low speed communication is an in-band communication between the receiver and the transmitter of the wireless power transfer system, and the high-speed communication is carried out by a receiver data transceiver.

The method further comprises in the low speed communication, configuring a plurality of switch-capacitor networks coupled to a receiver coil of the wireless power transfer system such that an impedance coupled to the receiver coil is adjusted according to an amplitude shift keying (ASK) modulation used by the wireless power transfer system, wherein the plurality of switch-capacitor networks is configured to provide a plurality of impedances coupled to the receiver coil using different ON and OFF combinations of the plurality of switch-capacitor networks, and wherein the plurality of impedances includes a first impedance corresponding to a high state of the ASK modulation and a second impedance corresponding to a low state of the ASK modulation.

The method further comprises sending a media access control (MAC) address from the receiver to the transmitter of the wireless power transfer system using the low speed communication.

The method further comprises disconnecting the high-speed communication after the receiver has been moved away from the transmitter of the wireless power transfer system for a predetermined time-out period.

The method further comprises disconnecting the high-speed communication after receiving a user disconnect command.

The method further comprises transferring power between the receiver and the transmitter of the wireless power transfer system, and transferring a plurality of data information between the receiver and the transmitter of the wireless power transfer system using the low speed communication, wherein once the low speed communication has been established, the step of transferring power between the receiver and the transmitter of the wireless power transfer system, and the step of transferring the plurality of data information between the receiver and the transmitter of the wireless power transfer system are carried out concurrently.

The method further comprises transferring power between the receiver and the transmitter of the wireless power transfer system, transferring a plurality of first data information between the receiver and the transmitter of the wireless power transfer system using the low speed communication, and transferring a plurality of second data information between the receiver and the transmitter of the wireless power transfer system using the high-speed communication, wherein once the high-speed communication has been established, the step of transferring power between the receiver and the transmitter of the wireless power transfer system, the step of transferring the plurality of first data information between the receiver and the transmitter of the wireless power transfer system using the low speed communication, and the step of transferring the plurality of second data information between the receiver and the transmitter of the wireless power transfer system using the high-speed communication are carried out concurrently.

Referring back to FIG. 2, the wireless power transfer system comprises a first power converter coupled to a power source, a transmitter circuit coupled to an output of the first power converter, a transmitter coil coupled to the transmitter circuit, a receiver coil magnetically coupled to the transmitter coil, a rectifier connected to the receiver coil, and a second power converter connected between the rectifier and a load.

The method further comprises receiving a media access control (MAC) address and a high-speed communication request from the transmitter of the wireless power transfer system using the low speed communication.

Figure 9:
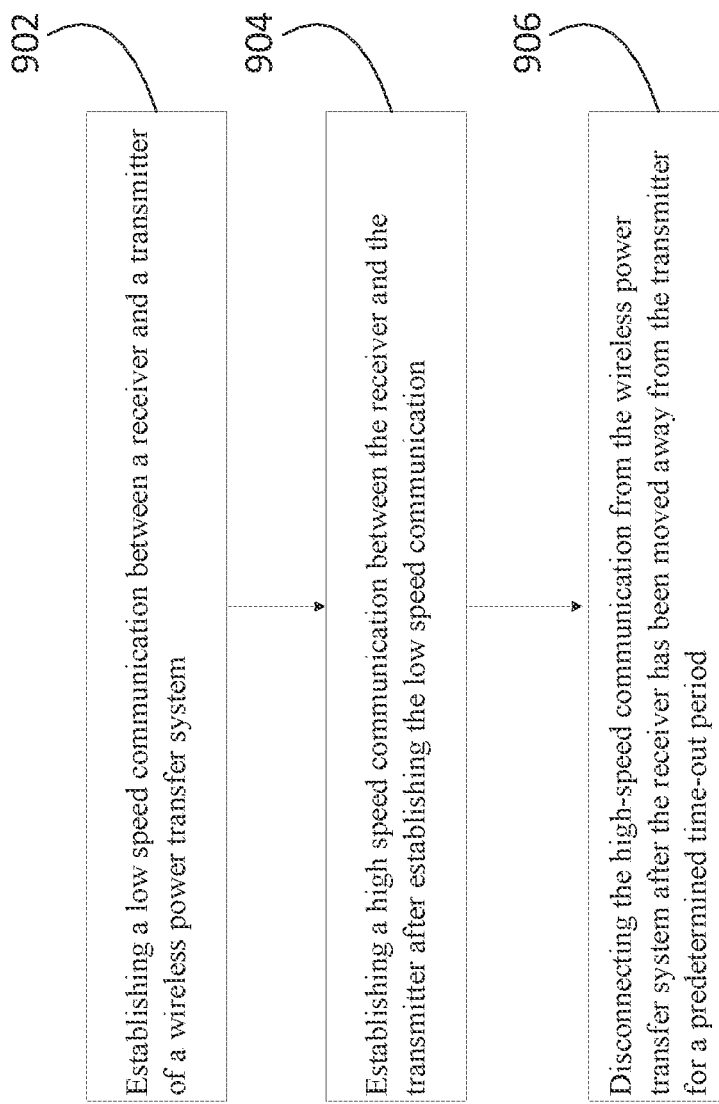
FIG. 9 illustrates a flow chart showing a first method of disconnecting the high-speed communication in accordance with various embodiments of the present disclosure.

FIG. 9 illustrates a flow chart showing a first method of disconnecting the high-speed communication in accordance with various embodiments of the present disclosure. This flowchart shown in FIG. 9 is merely an example, which should not unduly limit the scope of the claims. One of ordinary skill in the art would recognize many variations, alternatives, and modifications. For example, various steps illustrated in FIG. 9 may be added, removed, replaced, rearranged and repeated.

At step 902, a low speed communication is established between a receiver and a transmitter of a wireless power transfer system.

At step 904, a high-speed communication is established between the receiver and the transmitter after establishing the low speed communication.

At step 906, the high-speed communication is disconnected from the wireless power transfer system after the receiver has been moved away from the transmitter for a predetermined time-out period.

Figure 10:
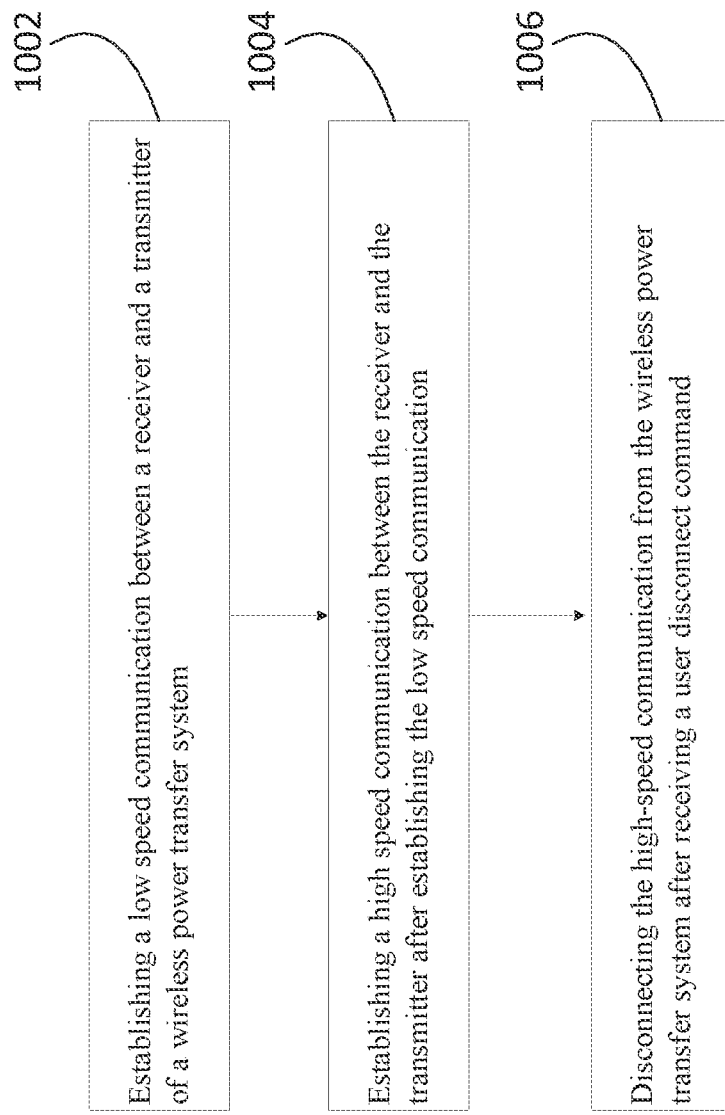
FIG. 10 illustrates a flow chart showing a second method of disconnecting the high-speed communication in accordance with various embodiments of the present disclosure.
Figure 1:
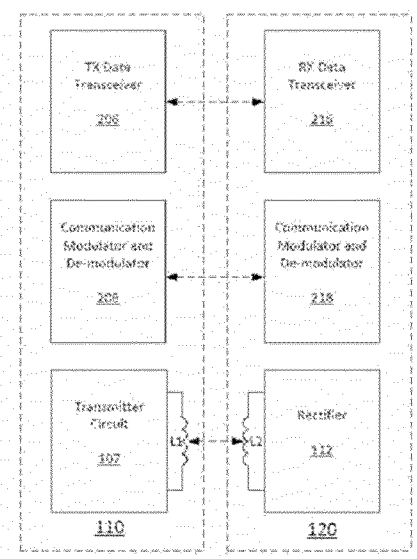

FIG. 10 illustrates a flow chart showing a second method of disconnecting the high-speed communication in accordance with various embodiments of the present disclosure. This flowchart shown in FIG. 10 is merely an example, which should not unduly limit the scope of the claims. One of ordinary skill in the art would recognize many variations, alternatives, and modifications. For example, various steps illustrated in FIG. 10 may be added, removed, replaced, rearranged and repeated.

At step 1002, a low speed communication is established between a receiver and a transmitter of a wireless power transfer system.

At step 1004, a high-speed communication is established between the receiver and the transmitter after establishing the low speed communication.

At step 1006, the high-speed communication is disconnected from the wireless power transfer system after receiving a user disconnect command.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

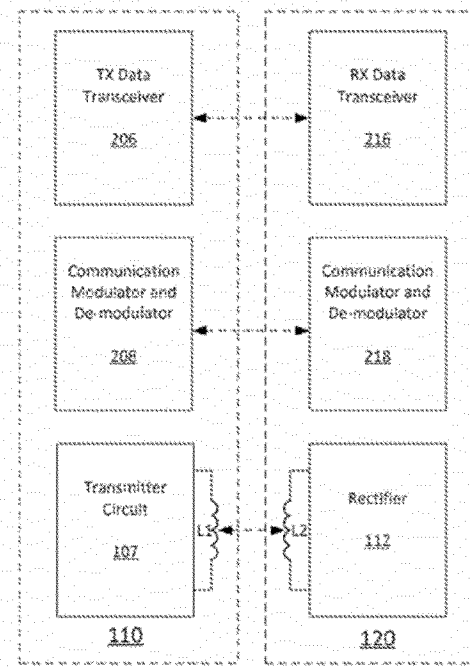

What is claimed is:

1. An apparatus comprising:
   a rectifier coupled to a receiver coil, the receiver coil configured to be magnetically coupled to a transmitter coil of a wireless power transfer system, wherein the rectifier is configured to convert an alternating current voltage into a direct current voltage;
   a first communication apparatus configured to provide a low speed communication to a transmitter of the wireless power transfer system, wherein the first communication apparatus comprises an amplitude shift keying (ASK) modulator configured to provide the low speed communication between the apparatus and the transmitter of the wireless power transfer system;
   a second communication apparatus configured to provide a high-speed communication to the transmitter of the wireless power transfer system, wherein the high-speed communication provided by the second communication apparatus is enabled through the low speed communication provided by the first communication apparatus;
   a control unit comprising a processor; and
   a power converter connected to an output of the rectifier, and wherein:
      the control unit is fabricated in a first semiconductor die; and
      the rectifier, the ASK modulator and the power converter are fabricated in a second semiconductor die.

2. The apparatus of claim 1, wherein:
the high-speed communication provided by the second communication apparatus is established after a handshaking process has been completed in the first communication apparatus; and
the high-speed communication in the wireless power transfer system and provided by the second communication apparatus is disconnected after the apparatus has been moved away from the wireless power transfer system for a predetermined time-out period.

3. The apparatus of claim 1, wherein:
the high-speed communication provided by the second communication apparatus is established after a handshaking process has been completed in the first communication apparatus; and
the high-speed communication in the wireless power transfer system and provided by the second communication apparatus is disconnected after a user disconnect command has been received.

4. The apparatus of claim 1, wherein:
the second communication apparatus comprises a first data transceiver configured to be coupled to a second data transceiver in the wireless power transfer system.

5. The apparatus of claim 1, wherein:
the first data transceiver is fabricated in a third semiconductor die, and wherein the first semiconductor die, the second semiconductor die and the third semiconductor die are embedded in a same semiconductor package.

6. The apparatus of claim 1, wherein:
the first semiconductor die and the second semiconductor die are in an embedded wafer level ball grid array (eWLB) package.

7. The apparatus of claim 1, wherein:
the first semiconductor die and the second semiconductor die are in an embedded silicon fan out (eSiFO) package.

8. A method comprising:
establishing a low speed communication between a receiver and a transmitter of a wireless power transfer system;
transferring authentication data between the receiver and the transmitter of the wireless power transfer system using the low speed communication;
sending a media access control (MAC) address from the transmitter to the receiver of the wireless power transfer system using the low speed communication;
determining, by the receiver, whether it is necessary to establish a high-speed communication;
sending a connect request signal using the low speed communication once the receiver approves the high speed communication; and
once receiving a connect approval reply, establishing a high-speed communication between the receiver and the transmitter of the wireless power transfer system.

9. The method of claim 8, wherein:
the low speed communication is an in-band communication between the receiver and the transmitter of the wireless power transfer system; and
the high-speed communication is carried out by a receiver data transceiver.

10. The method of claim 8, further comprising:
disconnecting the high-speed communication after the receiver has been moved away from the transmitter of the wireless power transfer system for a predetermined time-out period.

11. The method of claim 8, further comprising:
disconnecting the high-speed communication after receiving a user disconnect command.

12. The method of claim 8, further comprising:
transferring power between the receiver and the transmitter of the wireless power transfer system; and
transferring a plurality of data information between the receiver and the transmitter of the wireless power transfer system using the low speed communication, wherein once the low speed communication has been established, the step of transferring power between the receiver and the transmitter of the wireless power transfer system, and the step of transferring the plurality of data information between the receiver and the transmitter of the wireless power transfer system are carried out concurrently.

13. The method of claim 8, further comprising:
transferring power between the receiver and the transmitter of the wireless power transfer system;
transferring a plurality of first data information between the receiver and the transmitter of the wireless power transfer system using the low speed communication; and
transferring a plurality of second data information between the receiver and the transmitter of the wireless power transfer system using the high-speed communication, wherein once the high-speed communication has been established, the step of transferring power between the receiver and the transmitter of the wireless power transfer system, the step of transferring the plurality of first data information between the receiver and the transmitter of the wireless power transfer system using the low speed communication, and the step of transferring the plurality of second data information between the receiver and the transmitter of the wireless power transfer system using the high-speed communication are carried out concurrently.

14. A system comprising:
a first power converter coupled to a power source;
a transmitter circuit coupled to an output of the first power converter;
a transmitter coil coupled to the transmitter circuit;
a receiver coil magnetically coupled to the transmitter coil;
a rectifier connected to the receiver coil, the receiver coil being magnetically coupled to the transmitter coil, wherein the rectifier is configured to convert an alternating current voltage into a direct current voltage;
a second power converter connected between the rectifier and a load;
a first communication apparatus configured to provide a low speed communication between a receiver and a transmitter of the system;
a second communication apparatus configured to provide a high-speed communication between the receiver and the transmitter of the system, wherein the high-speed communication provided by the second communication apparatus is enabled through the low speed communication provided by the first communication apparatus;
a control unit comprising a processor; and
an amplitude shift keying (ASK) modulator configured to provide the low speed communication between the receiver and the transmitter, and wherein:
the control unit is fabricated in a first semiconductor die; and
the rectifier, the ASK modulator and the second power converter are fabricated in a second semiconductor die, and wherein the first semiconductor die and the second semiconductor die are embedded in a same package.

15. The system of claim 14, wherein:
the second communication apparatus comprises a receiver data transceiver and a transmitter data transceiver;
the low speed communication is an in-band communication between the receiver and the transmitter of the system;
the high-speed communication performed by the second communication apparatus is established after a handshaking process has been completed in the first communication apparatus; and
the high-speed communication performed by the second communication apparatus is disconnected from the system after the receiver has been moved away from the transmitter for a predetermined time-out period.

\* \* \* \* \*

UNITED STATES PATENT AND TRADEMARK OFFICE
CERTIFICATE OF CORRECTION

| | | |
|---|---|---|
| PATENT NO. | : 12,266,950 B2 | Page 1 of 3 |
| APPLICATION NO. | : 18/143523 | |
| DATED | : April 1, 2025 | |
| INVENTOR(S) | : Li et al. | |

It is certified that error appears in the above-identified patent and that said Letters Patent is hereby corrected as shown below:

On the Title Page

The Title page, showing the illustrative figure, should be deleted and substituted therefor the attached Title page.

In the Drawings

Replace FIG. 1 with FIG. 1 as shown on the attached page.

Signed and Sealed this
Eighteenth Day of November, 2025

John A. Squires
*Director of the United States Patent and Trademark Office*

(12) United States Patent
Li et al.

(10) Patent No.: US 12,266,950 B2
(45) Date of Patent: Apr. 1, 2025

(54) WIRELESS POWER COMMUNICATION APPARATUS AND METHOD

(71) Applicant: NuVolta Technologies (Hefei) Co., Ltd., Hefei (CN)

(72) Inventors: Zeng Li, Shanghai (CN); Jian Lu, Shanghai (CN); Zhijun Luo, Shanghai (CN); Jinbiao Huang, Nashua, NH (US)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 146 days.

(21) Appl. No.: 18/143,523

(22) Filed: May 4, 2023

(65) Prior Publication Data
US 2024/0313586 A1  Sep. 19, 2024

(30) Foreign Application Priority Data
Mar. 18, 2023 (CN) ............ 202310280664.7

(51) Int. Cl.
*H02J 50/80* (2016.01)
*H02J 50/12* (2016.01)
*H04B 5/79* (2024.01)

(52) U.S. Cl.
CPC ............ *H02J 50/80* (2016.02); *H02J 50/12* (2016.02); *H04B 5/79* (2024.01)

(58) Field of Classification Search
CPC ............ H02J 50/12; H02J 50/80; H04B 5/79
USPC ............................................. 307/104
See application file for complete search history.

(56) References Cited

U.S. PATENT DOCUMENTS

2014/0312686 A1* 10/2014 Shraga ............... H02J 50/10
  307/10.1
2017/0353054 A1* 12/2017 Lee ..................... H02J 5/00

* cited by examiner

Primary Examiner — Michael R. Fin
(74) Attorney, Agent, or Firm — AP3 Law Firm PLLC

(57) ABSTRACT

An apparatus includes a rectifier coupled to a receiver coil, the receiver coil configured to be magnetically coupled to a transmitter coil of a wireless power transfer system, wherein the rectifier is configured to convert an alternating current voltage into a direct current voltage, a first communication apparatus configured to provide a low speed communication to a transmitter of the wireless power transfer system, and a second communication apparatus configured to provide a high-speed communication to the transmitter of the wireless power transfer system, wherein the high-speed communication provided by the second communication apparatus is enabled through the low speed communication provided by the first communication apparatus.

15 Claims, 10 Drawing Sheets